Aug. 10, 1965  A. LISBIN  3,199,333
METHOD FOR FORMING SINK PARTITIONS
Filed Oct. 16, 1961  4 Sheets-Sheet 4
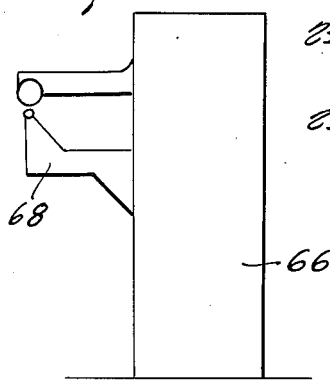
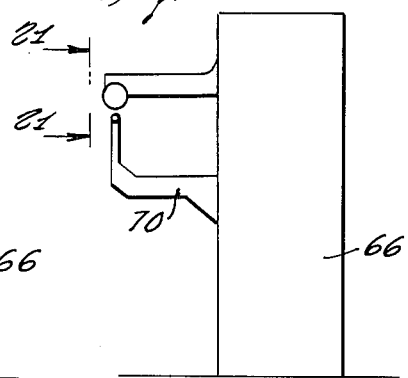
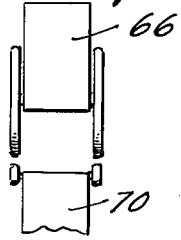
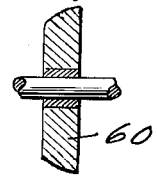
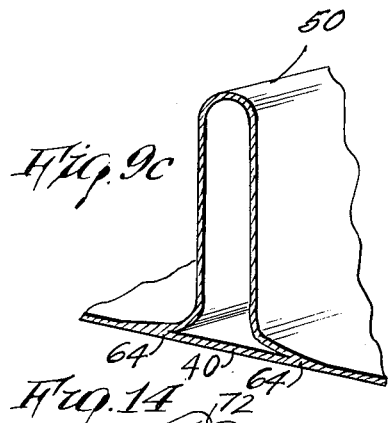
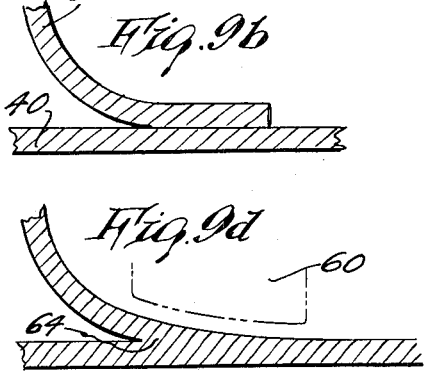
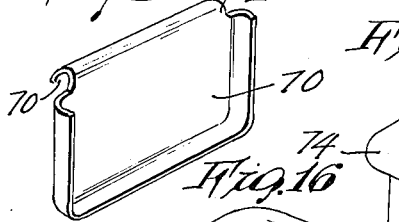
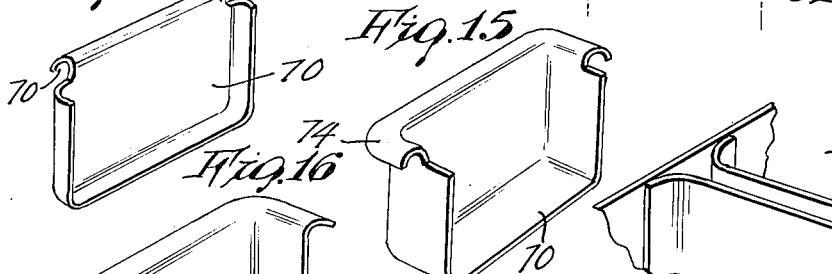
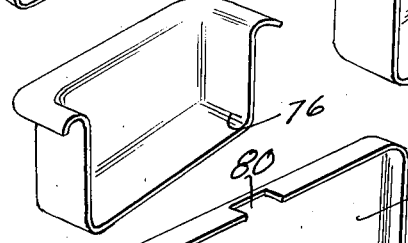
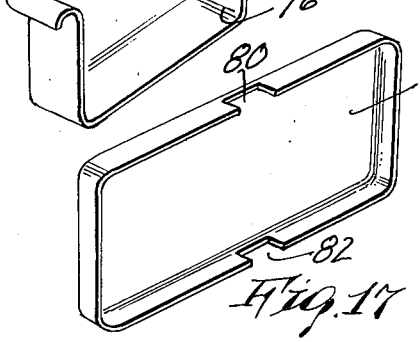
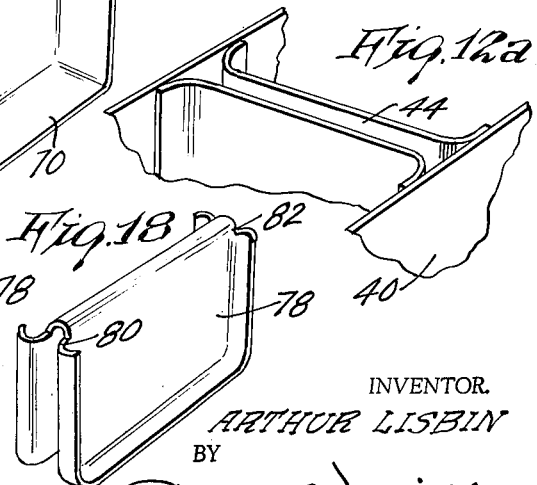
INVENTOR.
ARTHUR LISBIN
BY Carl Miller
ATTORNEY

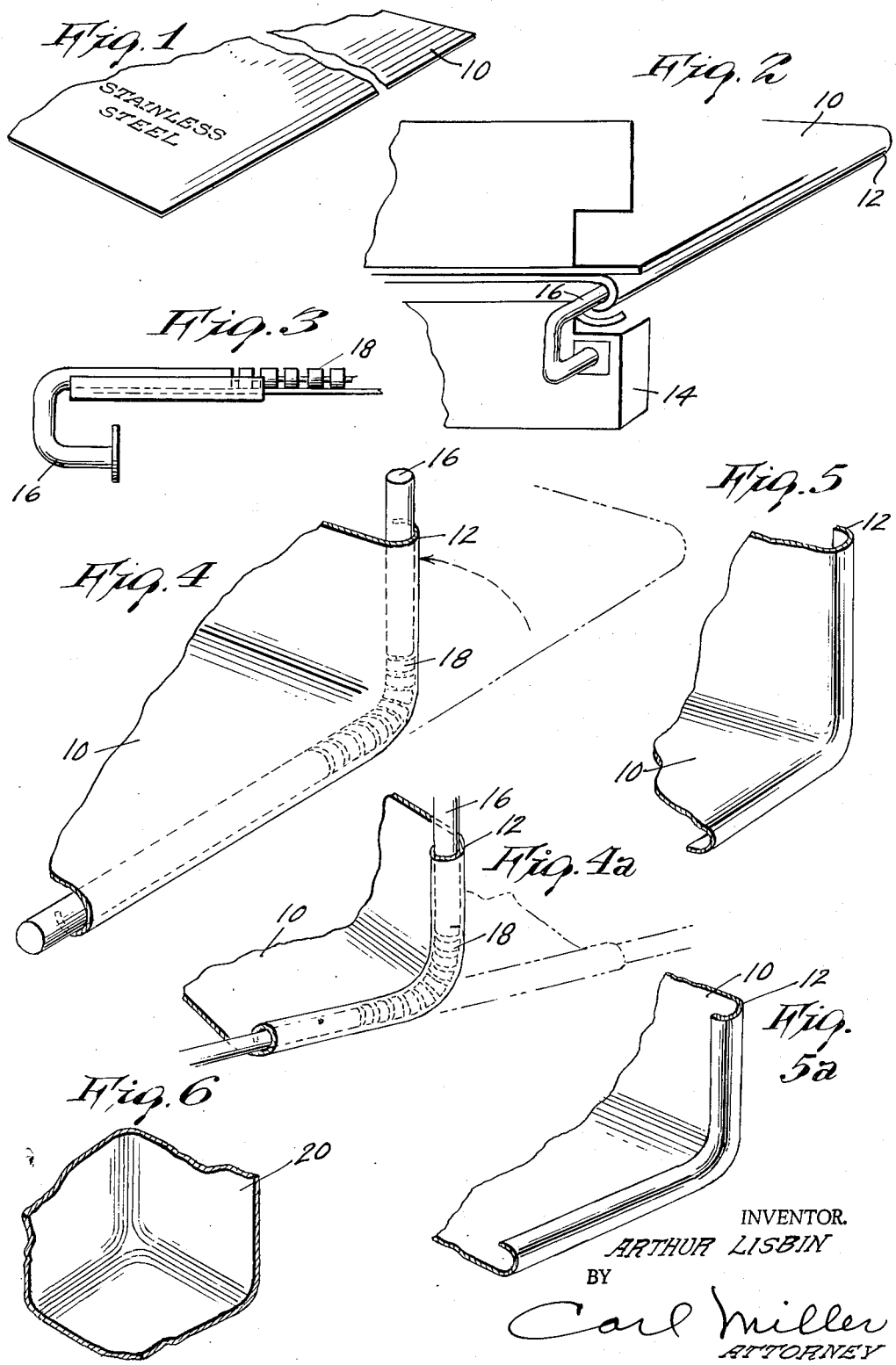

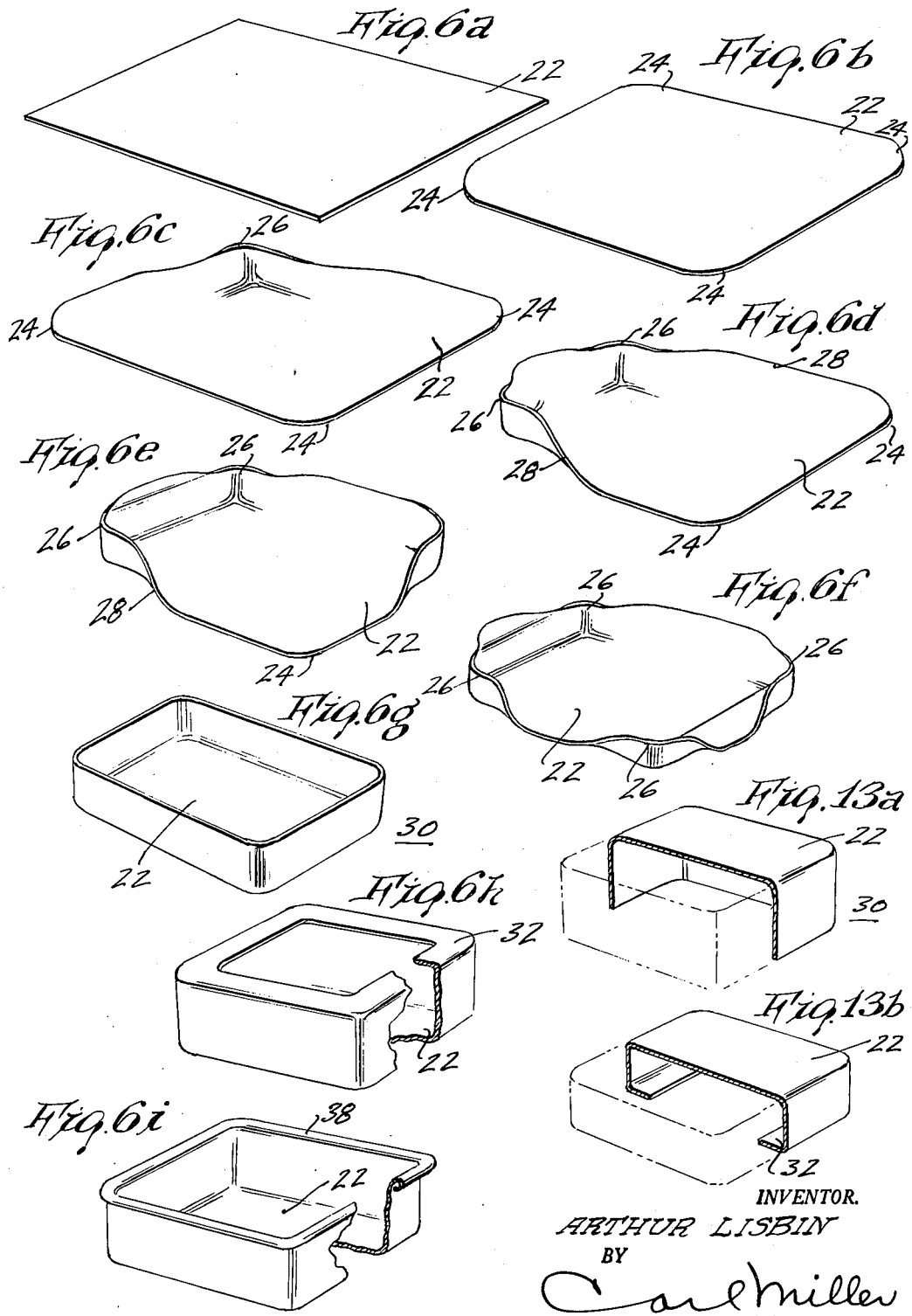

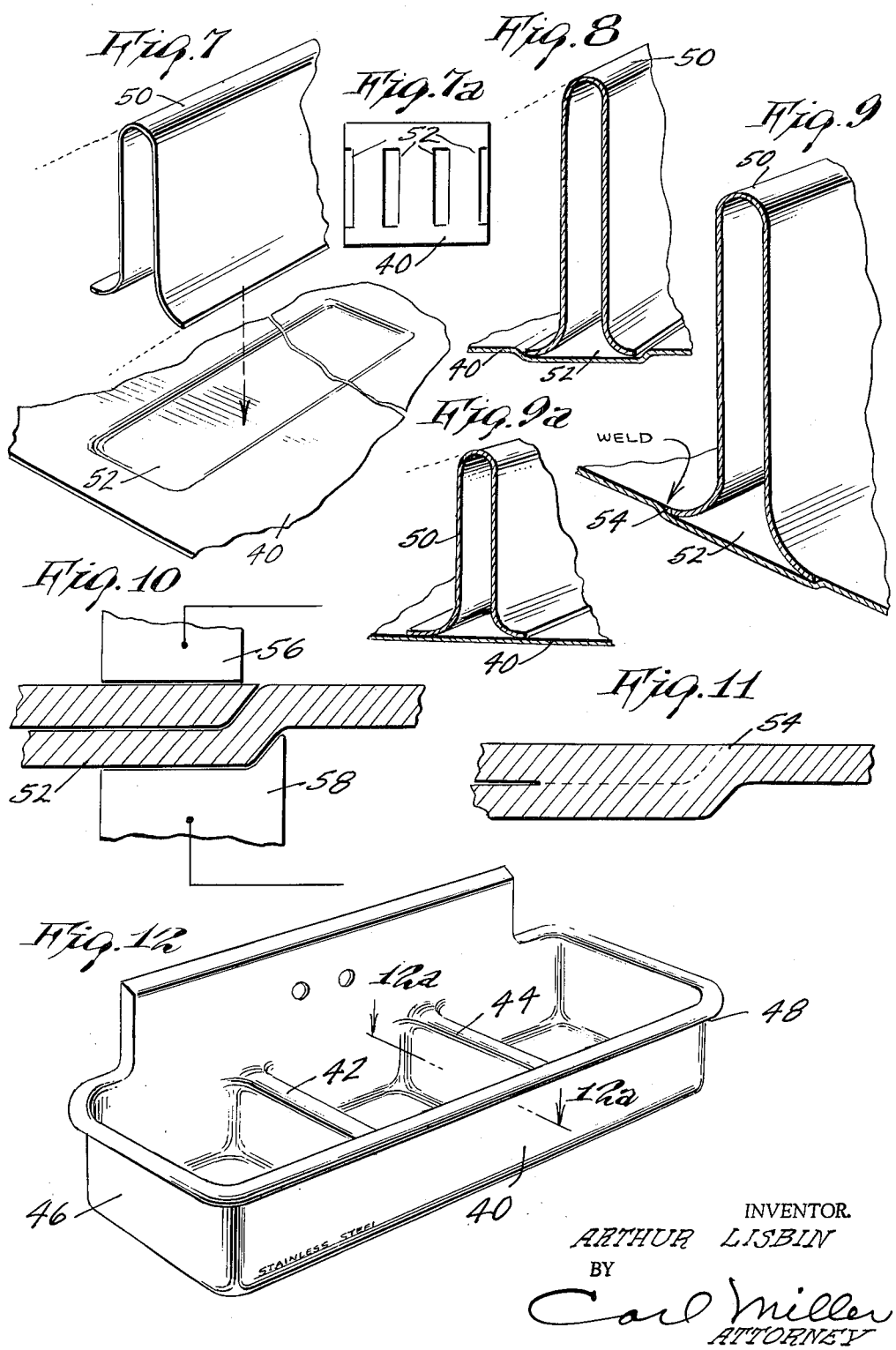

United States Patent Office 3,199,333
Patented Aug. 10, 1965

3,199,333
METHOD FOR FORMING SINK PARTITIONS
Arthur Lisbin, Upper Saddle River, N.J., assignor to New Jersey Bank and Trust Company, Paterson, N.J., a New Jersey banking corporation
Filed Oct. 16, 1961, Ser. No. 145,252
1 Claim. (Cl. 72—373)

My invention is directed toward means and methods for forming sinks, partitions, worktable tops, bowls, drainboards and dish tables.

It is an object of my invention to provide methods and means for forming items of the type referred to above that have the same outward appearance as known items of this type but wherein the labor cost in manufacturing same is significantly reduced.

Another object of my invention is to provide new processes for producing items of the above type wherein the labor cost in manufacturing same is reduced to about 40% of its conventional value.

Still another object of my invention is to provide a new method for welding pieces of the above identified items together.

Yet another object of my invention is to provide a new method for stamping corners in metal bodies.

A further object of my invention is to provide new methods for securing partitions and/or end pieces to sinks and the like.

Still a further object of my invention is to eliminate the necessity of using certain welding operations in forming items of the type described above.

All of the foregoing and still further objects and advantages of this invention will become apparent from a study of the following specification, taken in connection with the accompanying drawings wherein illustrative embodiments of my invention will now be described with reference to the accompanying drawings wherein:

FIGURE 1 shows a sheet of stainless steel in th raw "as purchased" state.

FIGURE 2 shows a stainless steel sheet with a rolled edge supporting a flexible mandrel accommodating the contours of the edge as inserted in a leaf brake.

FIGURE 3 is a detail view of the flexible mandrel used in FIGURE 2.

FIGURE 4 shows a stainless steel sheet having an outside radius bend with the mandrel still inserted.

FIGURE 4a shows a stainless steel sheet having an inside radius bend with the mandrel still inserted.

FIGURE 5 shows a stainless steel sheet with a finished outside radius bend and roll.

FIGURE 5a shows a stainless steel sheet with a finished inside radius bend and roll.

FIGURE 6 shows a stainless steel sheet having a finished isometrical corner.

FIGURE 6a shows a stainless steel sheet ready for corner forming.

FIGURE 6b shows a stainless steel sheet having corners blanked to permit a corner stamping operation without wrinkling.

FIGURE 6c shows a stainless steel sheet having a single corner stamping.

FIGURE 6d shows a stainless steel sheet having a double corner stamping.

FIGURE 6e shows a stainless steel sheet having a three corner stamping, one corner being formed at a time.

FIGURE 6f shows a stainless steel sheet having four individual corners ready for re-striking.

FIGURE 6g shows a stainless steel sheet having four corners after re-striking and formed into a pan.

FIGURE 6h shows the stainless steel pan of FIGURE 6g but wherein the additional operation of flanging the perimeter of the pan inward.

FIGURE 6i shows the stainless steel pan of FIGURE 6g having a beaded outer perimeter.

FIGURE 7 is an exploded view showing how a central partition in a stainless steel sink can be recessed into the body of the sink.

FIGURE 7a shows in plan view a portion of a sink body having recesses to accommodate partitions and ends.

FIGURE 8 shows in perspective a partition recessed into a slot of a sink body.

FIGURE 9 is another perspective view of the arrangement of FIGURE 8 as thereafter welded and polished.

FIGURE 9a shows the arrangement similar to that of FIGURE 8 but using no recess, the arrangement being in position for welding.

FIGURE 9b is a cross-sectional detail view of the members of FIGURE 9a in position for welding.

FIGURE 9c is a perspective view as in FIGURE 9a but illustrating a completed bevel weld.

FIGURE 9d is a cross-sectional detail view showing the completed bevel weld of FIGURE 9c.

FIGURE 10 is a detail view showing a new method of welding.

FIGURE 11 is a detail view showing members welded together in the manner of FIGURE 10.

FIGURE 12 is a perspective view of a stainless steel sink having central and end partitions and formed in accordance with the teachings of my invention.

FIGURE 12a is a cross sectional view of the sink of FIGURE 12 as taken along the line 12a—12a in FIGURE 12.

FIGURE 13a is a cross sectional view of the four cornered stainless steel pan of FIGURE 6g.

FIGURE 13b is a cross sectional view of the four cornered and inwardly flanged steel pan of FIGURE 6h.

FIGURE 14 is a perspective view of an end partition adapted for use in the sink of FIGURE 12 and having cut-outs for an insert to be added.

FIGURE 15 is a perspective view of a partition of the type shown in FIGURE 14 but having a roll made through a stamping operation.

FIGURE 16 is a perspective view of a partition of the type shown in FIGURE 14 but modified, eliminating the necessity of welding a corner insert.

FIGURE 17 is a perspective view of the four cornered stainless steel pan of FIGURE 6g but having two additional notches.

FIGURE 18 is a perspective view of the plan of stainless steel of FIGURE 17 as bent along the notches and ready to be used as a center partition in a sink.

FIGURE 19 is a side elevational view of welding apparatus having a special lower arm designed for use in welding operations of the type referred to in the above described figures.

FIGURE 20 is a side elevational view of welding apparatus as shown in FIGURE 19, but having another special lower arm.

FIGURE 21 is a front view of a resistance welder taken along the line 21—21 in FIGURE 20 showing the wheels.

FIGURE 22 is a cross sectional detail view of a wheel as used in the resistance welder of FIGURE 21.

In accordance with one feature of my invention, a stainless steel sheet can have a 90° inside or outside bend formed therein with the radius in one piece, thus eliminating the welding of an insert (pre-stamped corner). This feature will be explained with reference to FIGURES 1, 2, 3, 4, 4a, 5 and 5a.

A stainless steel sheet 10 having a rolled edge 12 is inserted into a leaf brake 14 with a flexible mandrel 16 accommodating the contours of the roll. (One mandrel is used for the inside radius and another one is used for the outer radius). The mandrel 16 has flexible links 18, thus allowing the mandral to shape the roll before it is bent in the brake. FIGURES 4 and 5 show an outer radius bend with the mandrel first inserted, and then removed. FIGURES 4a and 5a show an inner radius bend with the mandrel first inserted, then removed.

In accordance with another feature of my invention, a typical finished isometrical corner is formed in a stainless steel sheet whereby the vertical and horizontal corners smoothly intersect each other and there is no need to notch or weld an added insert to create coved-cornered interior. This feature will be explained with reference to FIGURES 6, 6a, 6b, 6c, 6d, 6e, 6f, 6g, 6h, 6i, 13a and 13b.

FIGURE 6 shows the completed corner at 20. To form this corner, a flat sheet of stainless steel is cut to size and laid out as determined by end use at 22 in FIGURE 6a. The four corners are then blanked at 24 in FIGURE 6b so that a stamping operation can be made without wrinkling. One or two corners are formed at a time by stamping the blanked sheet of stainless steel in a fadeaway die. FIGURES 6c, 6d, 6e and 6f show one, two, three and four corners 26 formed in plate 22 respectively. Note the fading 28 from the corner tapering to the flat sheet of stainless steel.

The stainless steel sheet 28 is then placed in a die and, after re-striking, is formed into a pan as shown in FIGURES 6g and 13a at 30.

The periphery of the pan can then be flanged in, as shown at 32 in FIGURES 6h and 13b. Alternatively, it can be flanged out. Further, if desired, the pan can have a beaded outer perimeter as shown at 38 in FIGURE 6i. (This is particularly useful for drawers and pans).

In accordance with still another feature of my invention, partitions (both center and end) can be fitted into recesses of supporting members and thereafter welded together in a novel manner. This will be explained with specific reference to a sink.

FIGURES 12 and 12a show a stainless steel sink formed in accordance with the processes of my invention having a sink body 40, first and second center partitions 42 and 44, and end partitions 46 and 48.

FIGURE 7 shows a center partition member 50 fitting into a recess 52 into the sink body 40. Four such recesses 52 are provided for the two central partitions and two end partitions as shown in FIGURE 7a.

FIGURE 8 shows partition 50 in position in recess 52 for welding. FIGURE 9 shows the same partition welded in place at 54 and polished. This weld I term a "Recessed Weld" and is shown in detail in FIGURE 11. To form the weld as shown in FIGURE 10, the members fitting together in the region of the edge of the recess have current passed therethrough from top and bottom wheels 56 and 58 of a resistance welder, thus causing these members to fuse together.

Alternatively, no recess 52 need be employed as shown in FIGURES 9a, 9b, 9c and 9d. Partition 50 is merely held in position on top of sink body 40. Welding wheels 60 and 62 as shown in FIGURE 9d hold the partition 50 and body 14 in place. Current is passed through the wheels 60 and 62 to heat the members to fusion. After cooling, a new type of weld which I term a "Beveled Weld" is formed at 64.

Welding apparatus for forming these welds is shown in side view at 66 in FIGURES 19 and 20 and in end view in FIGURE 21. A detailed view of the wheel 60 as used in the weld of FIGURE 9d is shown in FIGURE 22. The difference between FIGURES 19 and 20 is in the use of different lower arms, 68 and 70 respectively. Arm 68 is used for the "Recessed Weld"; arm 70 is used for the "Beveled Weld."

FIGURE 14 shows an end partition 70 for either the left or right end of a sink having cut outs 72 for the insert to be added.

FIGURE 15 shows a variation of FIGURE 14 having a roll 74 added, this roll being made through a stamping operation. It is used with recessed bodies.

FIGURE 16 shows another variation of FIGURE 14 at 76. This version eliminates the necessity of welding a corner insert.

FIGURE 17 shows a stainless steel pan 78 essentially the same as pan 30 in FIGURE 6g. However, pan 78 has two notches 80 and 82. Pan 78 can be bent along a line defined by notches 80 and 82 to form a member ready to be used as a center partition as shown in FIGURE 18.

While I have shown and pointed out and described the novel features of my invention as applied to the embodiments disclosed herein, it will be obvious to those skilled in the art that many modifications and changes within the scope and sphere of my invention will be obvious to those skilled in the art. Hence, I desire to be limited in my protection only by the terms of the claim which follows.

Having thus described my invention, I claim as new and desire to secure by Letters Patent:

A method for forming a partition for a stainless steel sink of sheet metal comprising the sequential steps of:
 (a) blanking each corner of a rectangular sheet of stainless steel,
 (b) stamping the blanked corners in a fadeaway die,
 (c) re-striking the stamped sheet to form an isometric corner at each corner thereof, whereby to form a rectangular pan having a bottom and side walls,
 (d) forming a like slot centrally in each of two opposed side walls of the pan, and
 (e) bending the two portions of the bottom of said pan on each side of said slots into back to back parallel relation such that the other two sides of the pan will lie in a common plane and be directed outwardly.

References Cited by the Examiner
UNITED STATES PATENTS

| | | | |
|---|---|---|---|
| 1,088,641 | 2/14 | Webster | 113—51 |
| 1,103,966 | 7/14 | Holinger | 113—51 |
| 1,749,148 | 3/30 | McGregor | 113—116 |
| 2,669,914 | 2/54 | Swaine | 113—120 |
| 2,761,407 | 9/56 | Bowden | 113—51 |
| 2,966,873 | 1/61 | Hoffman et al. | |

CHARLES W. LANHAM, *Primary Examiner.*

NEDWIN BERGER, *Examiner.*